US010995833B2

(12) United States Patent
    Liang

(10) Patent No.:    US 10,995,833 B2
(45) Date of Patent:    May 4, 2021

(54) MECHANISM FOR STORING AND RELEASING MECHANICAL ENERGY

(71) Applicant: Botao Liang, Shenzhen (CN)

(72) Inventor: Botao Liang, Shenzhen (CN)

(*) Notice: Subject to any disclaimer, the term of this patent is extended or adjusted under 35 U.S.C. 154(b) by 310 days.

(21) Appl. No.: 16/330,356

(22) PCT Filed: Jul. 24, 2017

(86) PCT No.: PCT/CN2017/094040
    § 371 (c)(1),
    (2) Date: Mar. 4, 2019

(87) PCT Pub. No.: WO2018/113293
    PCT Pub. Date: Jun. 28, 2018

(65) Prior Publication Data
    US 2019/0226564 A1    Jul. 25, 2019

(30) Foreign Application Priority Data
    Dec. 21, 2016    (CN) .......................... 201611187062.3

(51) Int. Cl.
    *F16H 33/02*    (2006.01)
    *F03G 1/08*    (2006.01)
    *F03G 1/02*    (2006.01)

(52) U.S. Cl.
    CPC .............. *F16H 33/02* (2013.01); *F03G 1/02* (2013.01); *F03G 1/08* (2013.01); *F03G 2730/02* (2013.01); *F03G 2730/05* (2013.01)

(58) Field of Classification Search
    CPC . F16H 33/02; F16H 33/06; F03G 1/02; F03G 2730/05; F03G 1/08; F03G 2730/02
    See application file for complete search history.

(56) References Cited

U.S. PATENT DOCUMENTS 3,164,526 A * 1/1965 Girard .................... F16H 33/02
                                                      376/227
3,412,617 A * 11/1968 Holzer .................... F16H 33/02
                                                      74/3.54
(Continued)

*Primary Examiner* — William Kelleher
*Assistant Examiner* — Gregory T Prather
(74) *Attorney, Agent, or Firm* — Novoclaims Patent Services LLC; Mei Lin Wong

(57) ABSTRACT

A mechanism (100) for storing and releasing mechanical energy, which stores a low-power energy continuously inputted by a power transmission mechanism into an energy storage mechanism, and then controllably drives output in a high-power manner. The mechanism comprises a bracket (10), a supporting main shaft (11) arranged on the bracket (10), a driving gear (101) which sleeves over and rotates about the supporting main shaft (11), wherein arranged on one side of the driving gear (101) is at least one set of energy storage and release device (102). The mechanism (100) for storing and releasing mechanical energy is structurally simple and reliable. A light-weight high-efficiency drive mechanism may be fabricated by using a light-weight structural material or a composite material, which may store a large amount of low-power energy which is inputted continuously. The stored energy may then be released in a high-power manner by means of manual operations or smart electronic control, in order to drive equipment which require higher power to drive, or to be fed back to an original driving device by means of a designated transmission mechanism to be used as auxiliary kinetic energy. The mechanism features high operation efficiency and low energy consumption, and is thus high efficient in storing and releasing energy.

22 Claims, 6 Drawing Sheets

(56) References Cited

U.S. PATENT DOCUMENTS

| | | | | | |
|---|---|---|---|---|---|
| 3,706,230 | A | * | 12/1972 | Low | F16H 33/02 74/2 |
| 3,867,814 | A | * | 2/1975 | Schneider | F16H 33/02 60/413 |
| 4,911,268 | A | * | 3/1990 | Kulpa | F03G 1/08 185/37 |
| 5,477,748 | A | * | 12/1995 | Kimura | F16H 33/02 475/166 |
| 5,653,142 | A | * | 8/1997 | Kato | F16D 41/206 185/40 R |
| 10,113,359 | B1 | * | 10/2018 | Chen | E06B 9/60 |
| 2007/0186702 | A1 | * | 8/2007 | Schroetter | F16F 15/30 74/125.5 |
| 2008/0173115 | A1 | * | 7/2008 | Schulte-Tigges | F16H 33/02 74/25 |
| 2012/0125717 | A1 | * | 5/2012 | McGrail | F03G 1/02 185/39 |
| 2012/0273320 | A1 | * | 11/2012 | VanDruten | F16H 35/10 192/103 R |
| 2015/0275847 | A1 | * | 10/2015 | Sung | F16H 33/00 74/37 |
| 2016/0138690 | A1 | * | 5/2016 | Popovic | F16H 33/02 477/166 |
| 2017/0067549 | A1 | * | 3/2017 | Heiraas | F16H 1/28 |
| 2017/0122420 | A1 | * | 5/2017 | Armstrong | F16K 31/02 |
| 2018/0066739 | A1 | * | 3/2018 | Tsuchiya | F16H 29/14 |
| 2018/0209503 | A1 | * | 7/2018 | Weilenmann | F16H 33/08 |
| 2020/0049133 | A1 | * | 2/2020 | Pellegrin | F03G 3/00 |
| 2020/0328034 | A1 | * | 10/2020 | Loebner | F16D 41/04 |

* cited by examiner

C-C

D-D

MECHANISM FOR STORING AND RELEASING MECHANICAL ENERGY

BACKGROUND OF THE PRESENT INVENTION

Field of Invention

The present invention relates to a power drive mechanism, and more particularly to a driving mechanism for power storage and release.

Description of Related Arts

With the continuous development of the economy and society, the consumption of natural resources by human beings is increasing. Therefore, energy conservation has become an increasingly important issue in the world and energy-saving and environmentally friendly industries and daily-use products are constantly being developed.

At present, for many power drives, when they are running, the power output is not completely in a controllable state, and sometimes exceeds the calibration range. If the power output is too large, the unnecessary energy consumption is increased. If the power output is too small, it fails to provide the necessary driving force for the load. Therefore, it is always the industry's dream to solve the problem of accumulating energy from the relative small power input or the energy loss.

SUMMARY OF THE PRESENT INVENTION

An object of the present invention is to provide a mechanism for mechanical energy storage and release, which is capable of storing the dynamic energy with relatively small power which is continuously input from the power transmission mechanism and then controlling a driving output of the dynamic energy with relatively higher power.

In order to achieve the above object, the present invention is implemented by the following technical solutions:

A mechanism for storing and releasing mechanical energy of the present invention, which comprises a frame, a main support shaft disposed on the frame, and a main driving wheel coupled with the main support shaft and rotating around the main support shaft, characterized in that: the mechanism for storing and releasing mechanical energy comprises at least one set of energy storage and release device disposed on one side of the driving wheel, wherein the energy storage and release device is constructed by a driven wheel, an accumulator, an energy release wheel, a master-slave clutch control and an energy release control assembly, the master-slave clutch control is disposed between the driving wheel and the driven wheel for controlling the main driving wheel and the driven wheel to engage with or disengage from each other; the accumulator is connected with the driven wheel for accumulating energy when the driven wheel and the main driving wheel are engaged and having rotational movement in the same direction; the energy release control assembly, after the driven wheel and the main driving wheel are disengaged, controls the accumulator to release energy through the driven wheel with a rotational movement in a reverse direction to accumulating energy, and drive the energy release wheel to rotate in the reverse direction of the driven wheel; the accumulator is mounted on the frame, the energy release control assembly is mounted on the frame, the driven wheel and the energy release wheel, wherein the master-slave clutch control, the driven wheel, the energy release wheel and the main driving wheel are coaxially arranged.

The driving wheel is connected to an externally connected driving force component through a transmission mechanism, which includes a belt, a chain or a gear transmission mechanism; the energy release wheel is connected with a transmission mechanism, which includes a belt, a chain or a gear transmission mechanism for connecting to an externally connected power output component.

The accumulator is connected to the driven wheel by a rope, a belt or a chain and the accumulator is a high-elastic coil spring, a high-elastic bow spring, a spiral spring or a cylinder-type air accumulator.

The master-slave clutch control is a mechanical meshing clutch assembly, an electromagnetic clutch assembly, a friction clutch assembly or a ratchet clutch assembly.

The driven wheel is constructed by a rotating wheel, a circumferential ratchet teeth surrounding the rotating wheel in a circumferential direction thereof and adjacent to a front side of the driven wheel, and a clutch driven member, wherein the clutch driven member is disposed on an end surface of a cylinder or a circumferential wall of to the cylinder, and the cylinder is extended axially toward the main driving wheel; wherein the rotating wheel, the circumferential ratchet teeth and the clutch driven member are integral in structure; the master-slave clutch control is formed by the clutch driven member, a clutch plate coupling member sleeved on the main support shaft and positioned on one side of the driving wheel, and a clutch plate movement control member.

The energy release control assembly comprises a check pawl connected to the circumferential ratchet teeth, a driving pawl disposed on a rear side of the driven wheel and a pulley ratchet disposed on a front side or a circumferential surface of the energy release wheel and connected with the driving pawl.

The energy release control assembly comprises a check pawl connected to the circumferential ratchet teeth and a one-way bearing connected between the driven wheel and the energy release wheel, the one-way bearing is arranged to drive the energy release wheel to rotate in the same direction as the driven wheel when the driven wheel is controlled to release energy.

The energy release control assembly comprises a check pawl connected to the circumferential ratchet teeth and a friction ratchet mechanism connected between the driven wheel and the energy release wheel, wherein the friction ratchet mechanism is capable of driving the energy release wheel to rotate in the same direction as the driven wheel when the driven wheel is controlled to release energy.

The mechanism for storing and releasing mechanical energy comprises two energy storage and release devices coaxially, sequentially and adjacently arranged to define a main energy storage and release device and an auxiliary energy storage and release device, wherein the master-slave clutch control of the auxiliary energy storage and release device is disposed between the energy release wheel of the main energy storage and release device and saod driven wheel of the auxiliary energy storage and release device and is capable of controlling the energy release wheel and the driven wheel to engage or disengage.

The main support shaft is extended in length toward another side of the driving wheel, and the main energy storage and release device and the auxiliary energy storage and release device are sequentially disposed on the extended main support shaft.

The storage and release mechanism of the present invention has a simple and reliable structure, such as a lightweight and efficient driving mechanism manufactured by lightweight structural materials or composite materials, and is capable of storing the continuously inputted dynamic energy with relatively small power, such as human-powered energy, or excessive energy in the power drive, and releasing the energy with relatively higher power from the stored energy through human manipulation or intelligent electronic control, that the energy with relatively higher power is arranged for driving an equipment that requires relatively higher driving power or for feeding back to the original drive unit to serve as an auxiliary kinetic energy through a dedicated transmission.

The components in the mechanism for energy storage and release are compact in connection, high in efficiency during operation, and low in energy consumption. Therefore, the energy storage efficiency is high.

BRIEF DESCRIPTION OF THE DRAWINGS

The present invention is described in further detail with the accompanying drawings and embodiments as follows.

The numeral references are as follows: 10: frame, 11: main support shaft, 20: driven wheel, 21: cylinder, 22: rotating wheel, 23: circumferential ratchet teeth, 30: accumulator, 31: flexible medium, 40: energy release wheel, 41: pulley ratchet, 42: friction ratchet mechanism, 50: master-slave clutch control, 51: clutch driven member, 52: clutch plate coupling member, 53: clutch plate movement control member, 54: clutch control lever, 55: lever support shaft, 60: energy release control assembly, 61: check pawl, 62: pawl support shaft, 63: driving pawl, 100: energy storage and release mechanism, 101: driving wheel, 102: energy storage and release device, 1021: main energy storage and release device, 1022: auxiliary energy storage and release device, 103: single-set energy storage and release mechanism, 104: single-side multi-set energy storage and release mechanism, 105: double-side multi-set energy storage and release mechanism, 106: driving force component, 107: external load.

DETAILED DESCRIPTION OF THE PREFERRED EMBODIMENT

According to the present invention, a mechanism for storing and releasing mechanical energy (hereinafter referred to as the energy storage and release mechanism 100) can store the dynamic power from continuously driving small power, such as continuously driving of human power and low-power motor that continuously operates, as well as the excess energy generated by drive mechanisms of equipment or locomotive such as mechanical power machines and devices, car engines and rickshaw. Then the stored energy can be released at a higher power for re-driving or auxiliary driving when needed.

Figure 1:
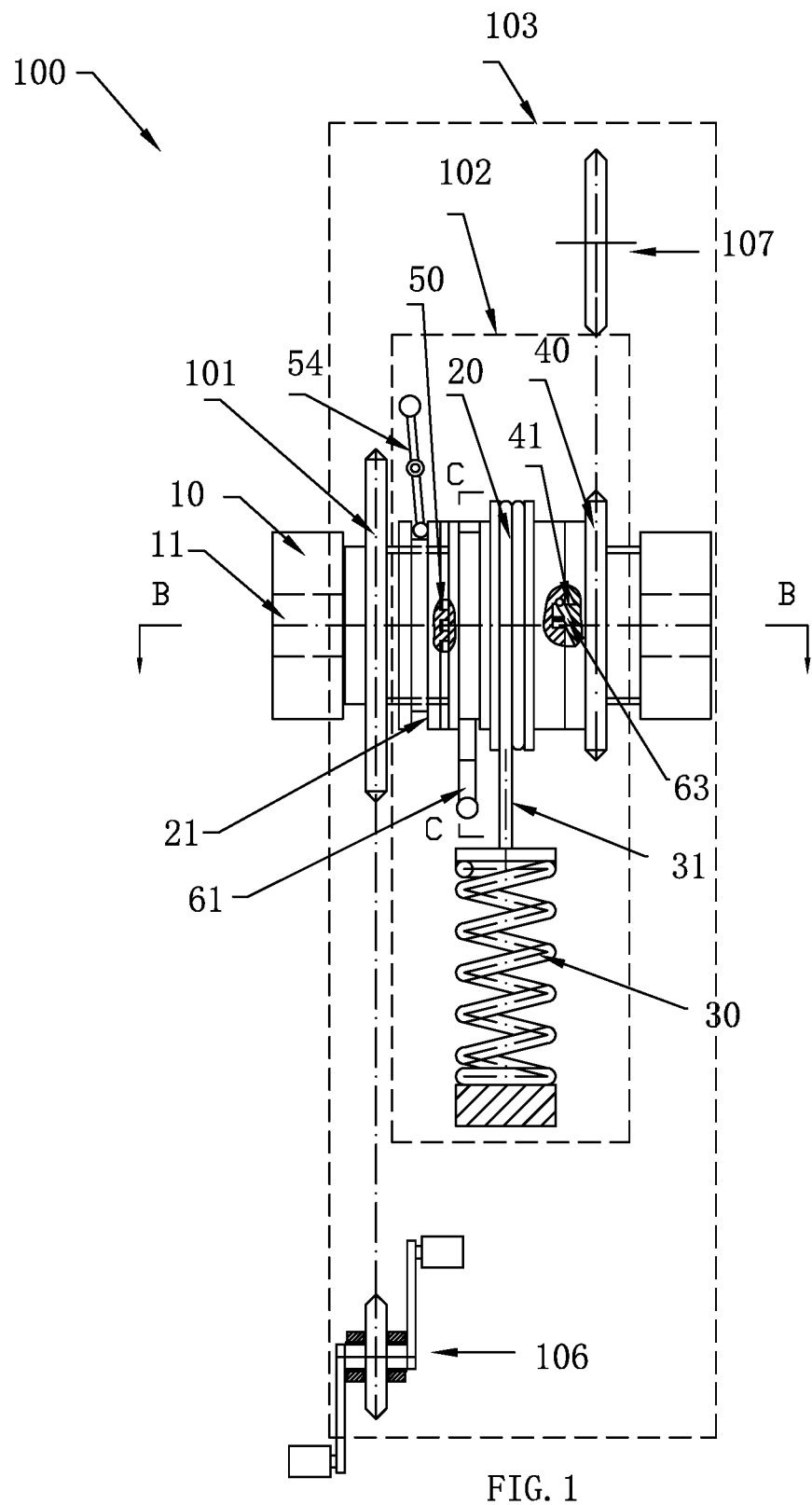
FIG. 1 is a top view of the present invention.
Figure 2:
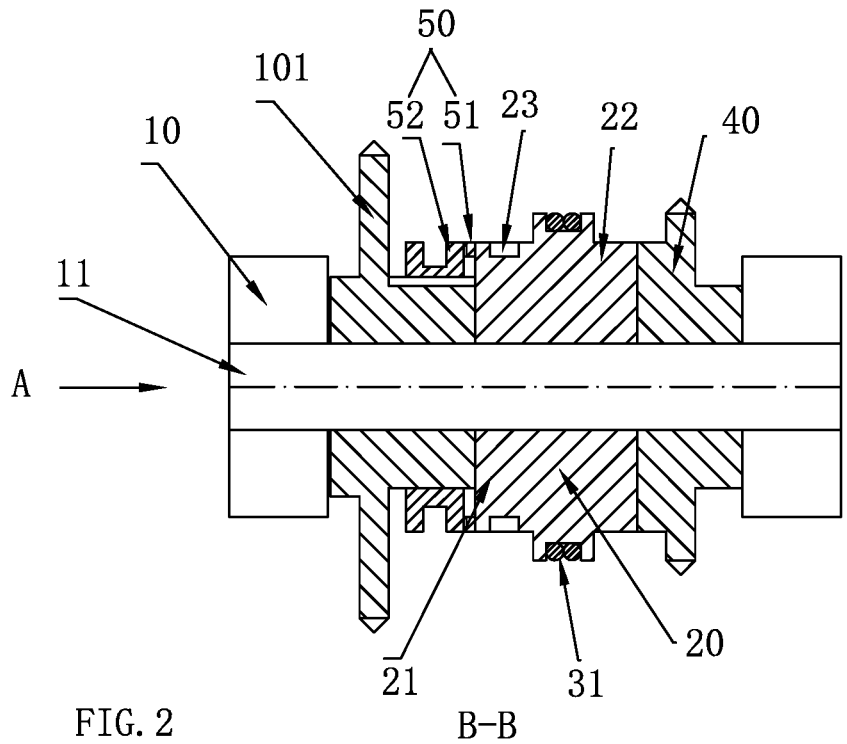
FIG. 2 is a cross-sectional view along line B-B of FIG. 1.
Figure 3:
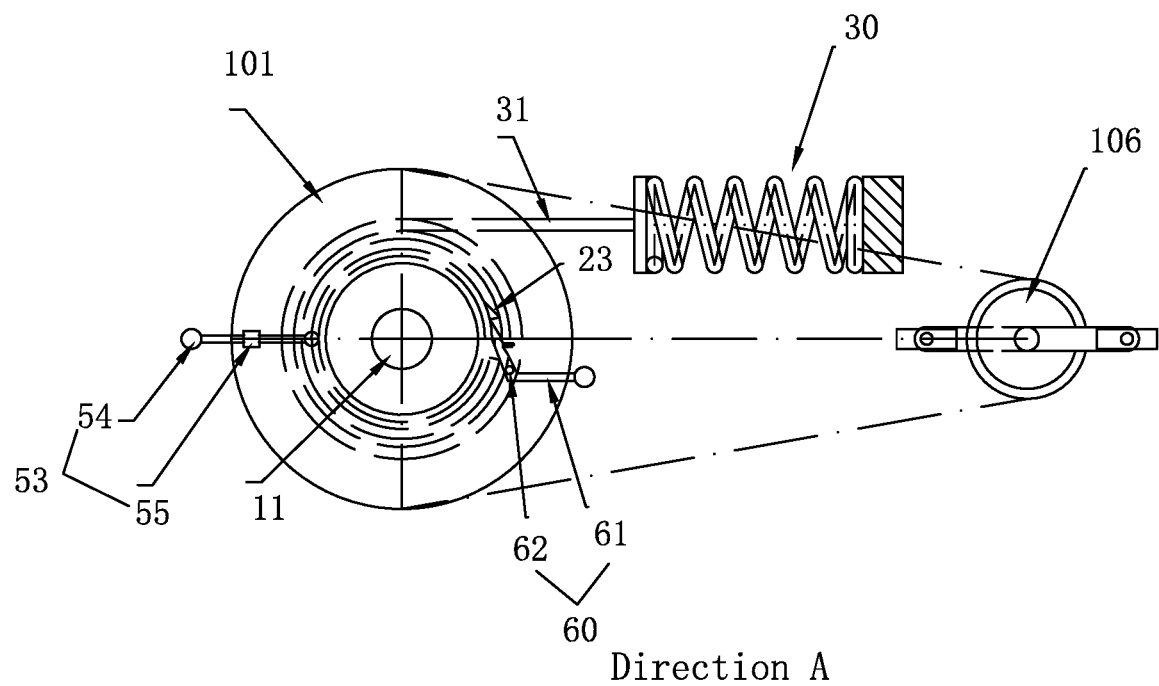
FIG. 3 is a side view along direction A of FIG. 2.
Figure 4:
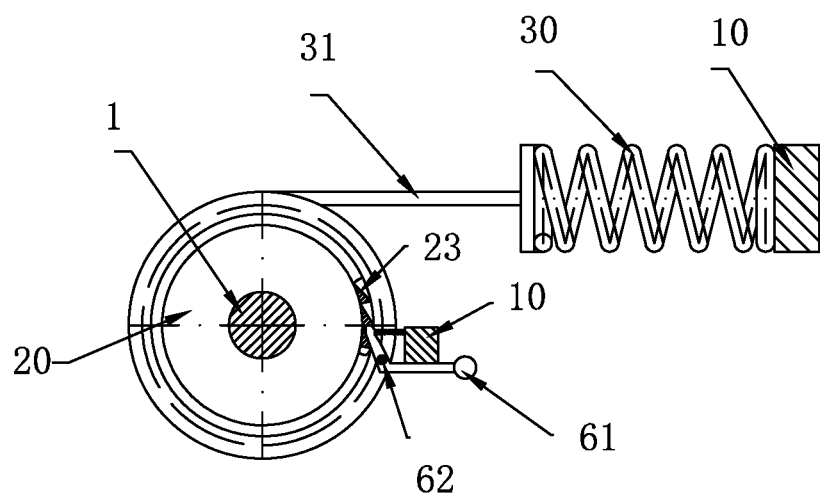
FIG. 4 is a cross-sectional view along line C-C of FIG. 1 (that is, a schematic diagram of the cooperation of the driven wheel, the accumulator, and the energy release control assembly)
Figure 5:
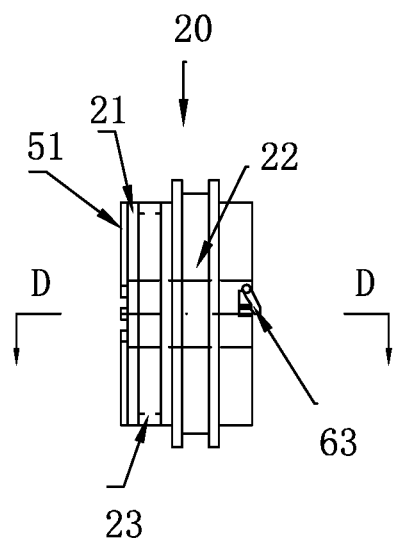
FIG. 5 is a schematic view of the driven wheel of FIG. 1.
Figure 6:
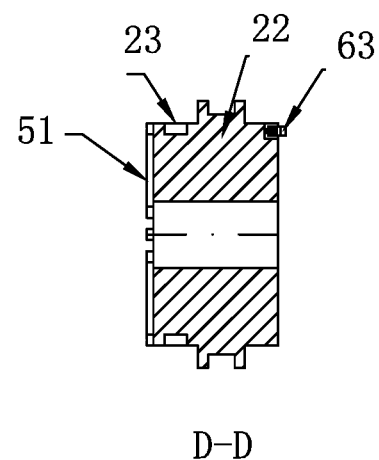
FIG. 6 is a cross-sectional view along line D-D of FIG. 5.
Figure 11:
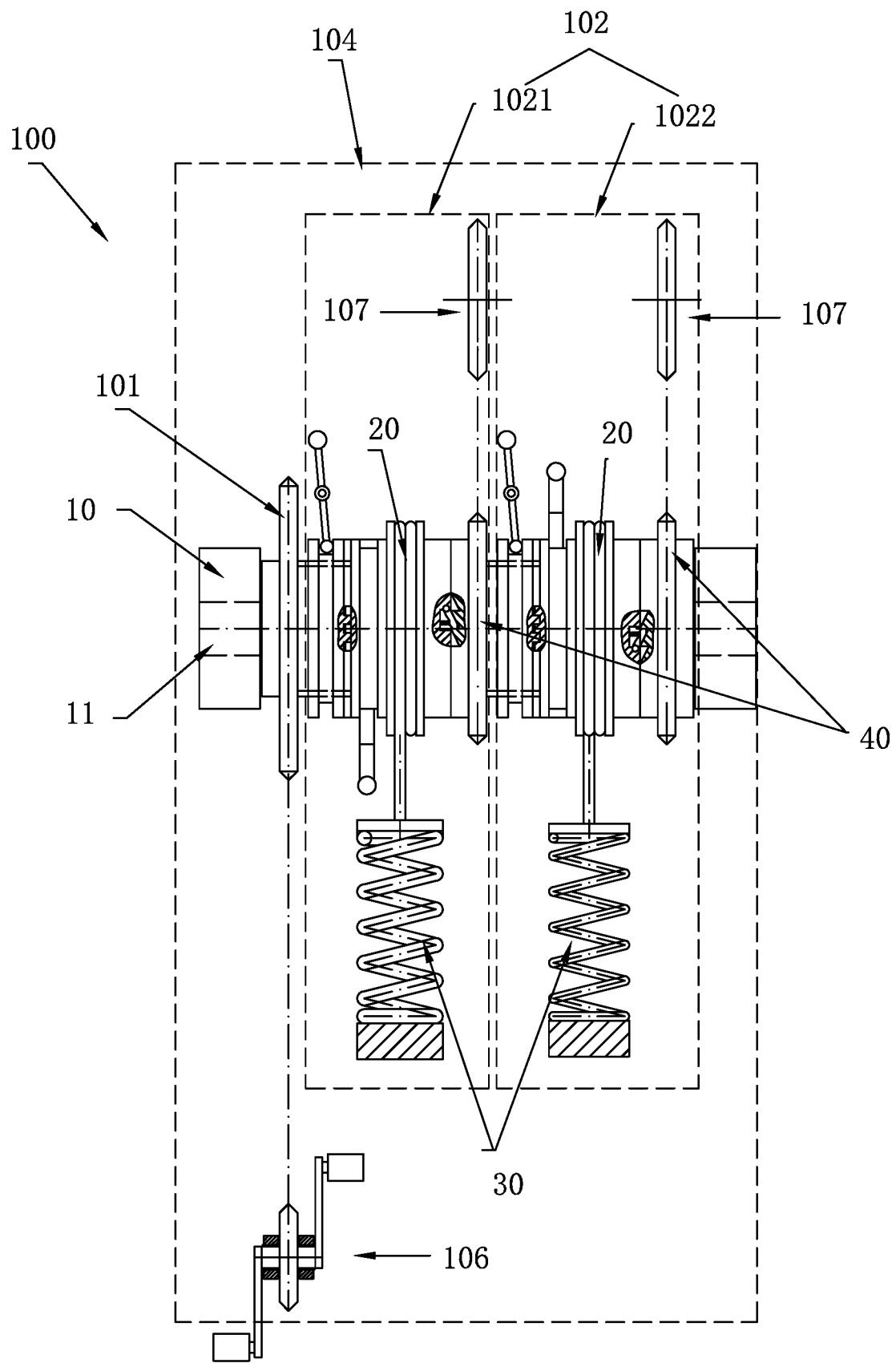
FIG. 11 is a schematic view showing the structure of a single-sided multi-set energy storage and release mechanism of the present invention.
Figure 12:
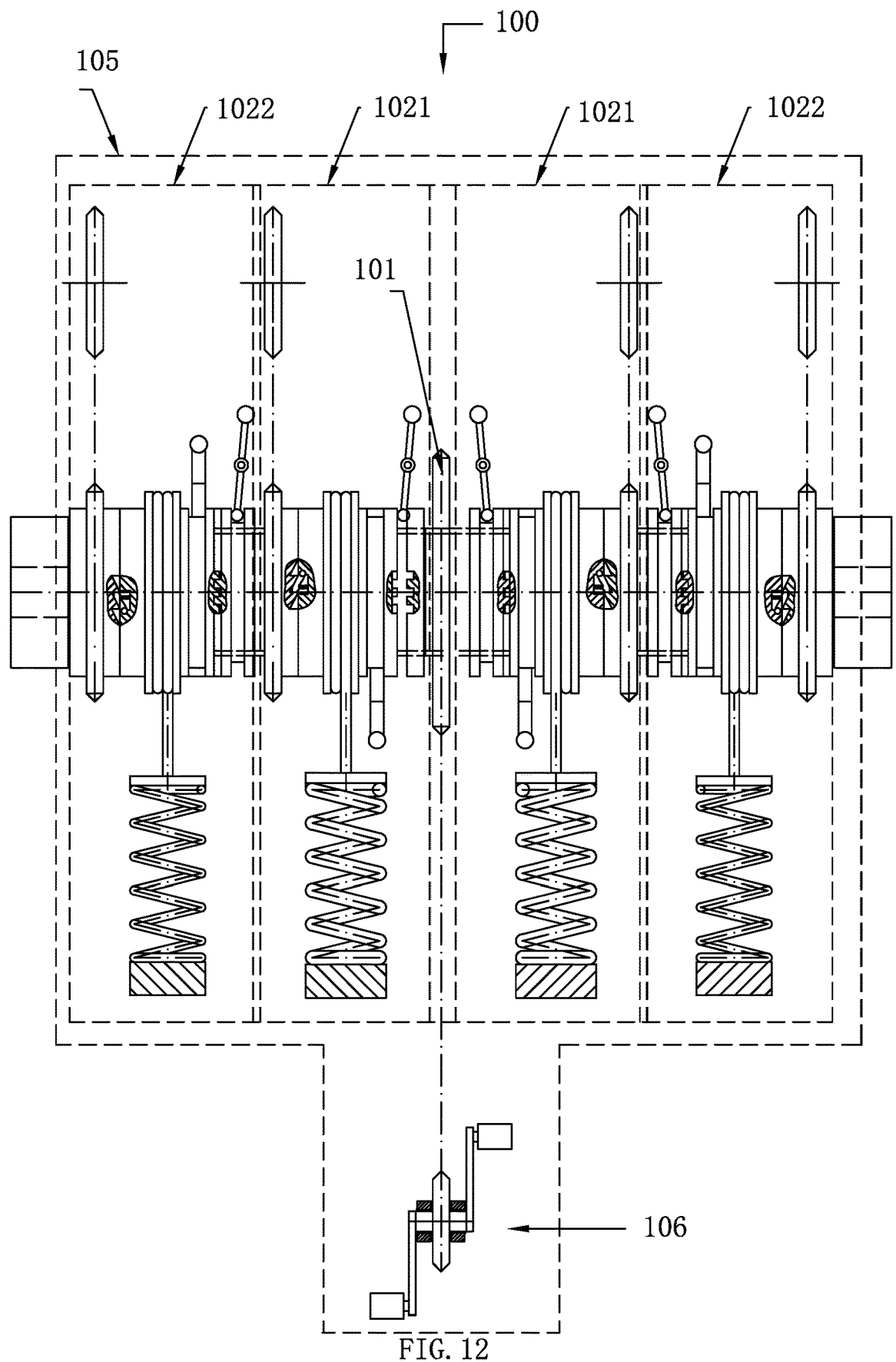
FIG. 12 is a schematic view showing the structure of the double-sided multi-set energy storage and release mechanism of the present invention.

The mechanism for storing and releasing mechanical energy comprises a driving force-controlled driving wheel 101 and at least one energy storage and release device 102, which can be independently applied to the drive mechanism (as shown in FIG. 1, a single-set energy storage and release mechanism 103 is illustrated). Alternately, two or more sets of the energy storage and release devices 102 may be arranged side by side at one side of the driving wheel 101 (as shown in FIG. 11, a single-side multi-set energy storage and release mechanism 104 is illustrated). In addition, two or more sets of energy storage and release devices 102 may be provided on both sides of the driving wheel 101 (as shown in FIG. 12, a double-sided multi-set energy storage and release mechanism 105 is illustrated.).

Specifically, whether the single-set energy storage and release mechanism 103, the single-side multi-set energy storage and release mechanism 104 or the double-sided multi-set energy storage and release mechanism 105 are employed depends on the size and the output power of the particular drive mechanism. In addition, the time at which the energy storage and release mechanism 100 of the present invention is controlled to store energy or to release energy depends on the needs. When releasing energy, the energy storage and release mechanism 100 can be controlled by manual control or by intelligently monitored electronic control devices.

Referring to FIG. 1 to FIG. 6 of the drawings, the mechanism for storing and releasing energy comprises a frame 10, a main support shaft 11 connected to the frame 10, a main driving wheel 101 coupled with the main support shaft 11 arranged for rotating around the main support shaft 11, and an energy storage and release device 102. The energy storage and release device 102 comprises a driven wheel 20, an accumulator 30, an energy release wheel 40, a master-slave clutch control 50 and an energy release control assembly 60.

The driving wheel 101, the driven wheel 20, and the energy release wheel 40 are coaxially arranged and connected in sequence. The driving wheel 101 is interlinked with the driven wheel 20 through the master-slave clutch control 50 (the driving wheel 101 and the driven wheel 20 are linked in motion by teething-type, interlocking-type or attraction-type connection) or separated. Under link motion, the driving wheel 101 drives the driven wheel 20 to rotate in the same direction and causes energy accumulation in the accumulator 30; after separation, if it is necessary to release the energy accumulated in the accumulator 30, the energy release control assembly 60 can cause the driven wheel 20 to rotate in the opposite direction (which is opposite to the rotation direction when accumulating energy) to drive the energy release wheel 40 to rotate in the same direction as the driven wheel and to drive other components to rotate through the energy release wheel 40, or by conventional transmission mechanism to feed this energy back to the load devices driven by the driving wheel 101.

1. Frame 10, Main Support Shaft 11

In general, the frame 10 may be the outer casing of the drive mechanism, or a specially designed fixing bracket and the frame has a fixed support for mounting the main support shaft 11.

The main support shaft 11 is mounted on the frame 10, and a length of the main support shaft 11 is determined by the particular type of the energy storage and release mechanism 100 installed, which is the single-set energy storage and release mechanism 103, the single-side multi-set energy storage and release mechanism 104 or the double-sided multi-set energy storage and release mechanism 105.

2. Main Driving Wheel 101

According to the present invention, the energy storage and release mechanism 100 only comprises one main driving wheel 101. The main driving wheel 101 is sleeved on the main support shaft 11 by a bearing, and is driven to rotational movement by a driving force. The driving wheel 101 can be connected to an externally connected driving force component 106 through a transmission mechanism such as a belt, a chain or a gear. The driving force can come from motor drive, steam drive, internal combustion drive or manual drive, which can provide driving force for the load device through a conventional transmission mechanism.

3. Driven Wheel 20

The driven wheel 20 employs a preferred structure, which is an integral structure of a rotating wheel 22, circumferential ratchet teeth 23 and a clutch driven member 51. The rotating wheel 22 is sleeved on the main support shaft 11 through a bearing, and a cylinder 21 extending toward the driving wheel 101 is provided on the front side thereof. (the side closer to the driving wheel 101 is a front side, and the side away from the driving wheel 101 is a rear side, the same below)

Figure 7:
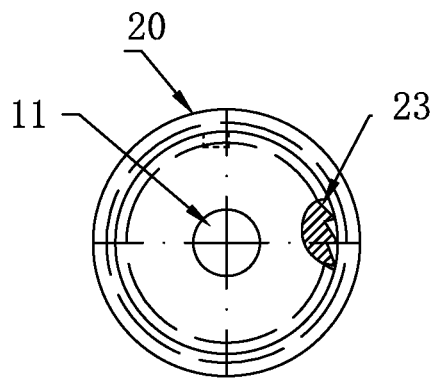
FIG. 7 is a partial cross-sectional view of circumferential ratchet teeth of the driven wheel.

The circumferential ratchet teeth 23 are disposed on the front side of the rotating wheel 22 and are uniformly arranged in the circumferential direction, or uniformly distributed around the peripheral wall of the rotating wheel 22 (as shown in FIG. 7).

The clutch driven member 51 is disposed on an end surface of the cylinder 21 or a circumferential wall of the cylinder 21. The master-slave clutch control 50 is formed by the clutch driven member 51, a clutch plate coupling member 52 that is sleeved on the main support shaft 11 and rotates with the driving wheel 101 on the side of the driving wheel 101 and a clutch plate movement control member 53.

4. Accumulator 30

Figure 9:
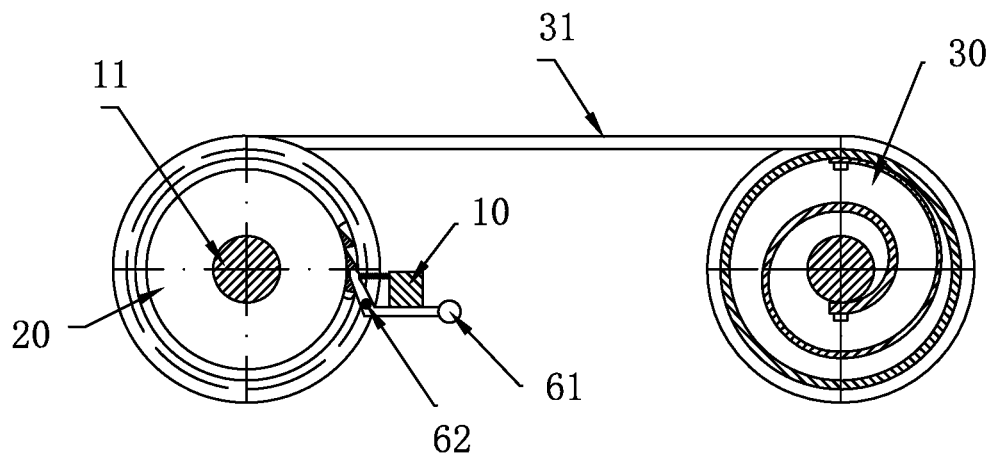
FIG. 9 is a schematic view showing the connection relationship of the driven wheel and the accumulator, which is in the form of a spiral spring.
Figure 10:
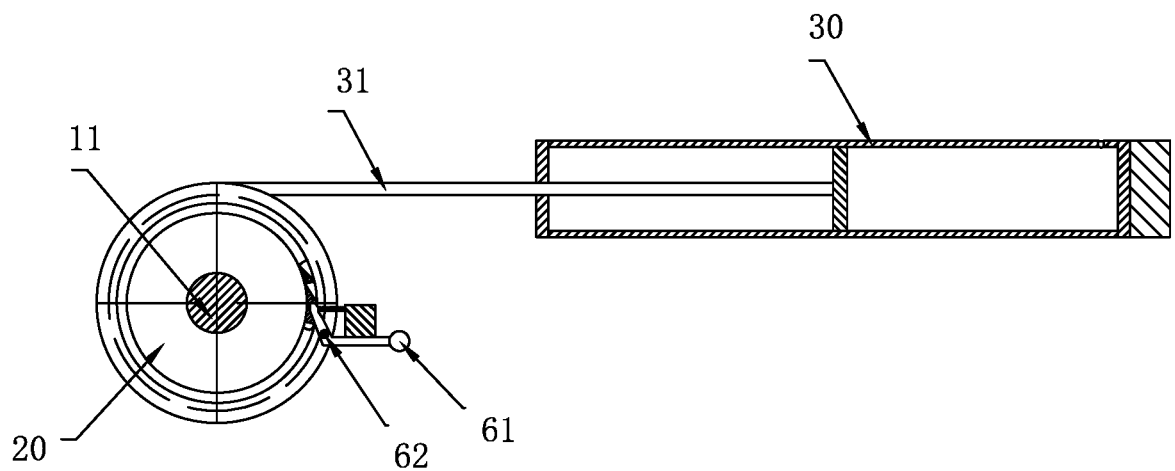
FIG. 10 is a schematic view showing the connection relationship of the driven wheel and the accumulator, which is in the form of a cylinder type air accumulator.

As shown in FIGS. 9 and 10, the accumulator 30 can be a high-elastic coil spring, a high-elastic bow spring, a spiral spring or a cylinder-type air accumulator 30. The accumulator 30 can be connected to the driven wheel 20 by a flexible medium 31 such as a rope, belt or chain. The flexible medium 31 has one end affixed to the accumulator 30 and another end wounded around the driven wheel 20. When the driven wheel 20 rotates with the driving wheel 101 and for energy accumulation, the flexible medium 31 pulls the accumulator 30 to deform and accumulate energy; when the driven wheel 20 is disengaged from linked motion with the driving wheel 101 and releases energy under the control of the energy release control assembly 60, the accumulator 30 pulls the flexible medium 31 to drive the driven wheel 20 to rotate in the opposite direction (i.e., opposite to the direction of rotation of the driven wheel 20 when accumulating energy), and the energy accumulated by the accumulator 30 is released by driving the energy release wheel 40 to work.

The accumulator 30 can also be an electrical energy accumulator.

5. Energy Release Wheel 40

As shown in FIGS. 1-6, the energy release wheel 40 is similar in function to the driving wheel 101, and is sleeved on the main support shaft 11 by bearings. The energy release wheel 40 can link to the driven wheel 20 under the control of the energy release control assembly 60 and follow the motion of the driven wheel 20 in the same direction. It can output a driving force to the load 107 which is connected externally through a transmission mechanism such as a belt, a chain or a gear. The energy accumulated in the accumulator 30 can also be fed back to the load device that the driving wheel 101 serves by a conventional transmission mechanism.

6. Master-Slave Clutch Control 50

As shown in FIGS. 1-6, the master-slave clutch control 50 is constructed by a clutch driven member 51 disposed on the driven wheel 20, a clutch plate coupling member 52 disposed on a side of the driving wheel 101 for rotation therewith and a clutch plate movement control member 53 mounted on the frame 10.

The master-slave clutch control 50 can be a mechanical meshing clutch assembly, an electromagnetic clutch assembly, a friction clutch assembly or a ratchet clutch assembly.

The clutch plate movement control member 53 includes a clutch control lever 54 and a lever support shaft 55 through which the clutch control lever 54 is mounted on the frame 10. The clutch control lever 54 has an inner end connected to the clutch plate coupling member 52 and can toggle the clutch plate coupling member 52 to engage to or disengage from the clutch driven member 51. The clutch control lever 54 has an outer end connected to a manual or an intelligent electronic control unit.

7. Energy Release Control Assembly 60

As shown in FIGS. 1-6, after the driven wheel 20 is separated from the driving wheel 101, the energy release control assembly 60 controls whether the accumulator 30 releases the energy accumulated by the accumulator 30 to the energy release wheel 40.

The energy release control assembly 60 of the present invention has the following structures:

1) The energy release control assembly 60 is constructed by a check pawl 61 connected to the circumferential ratchet teeth 23, a driving pawl 63 disposed on a rear side of the driven wheel 20 and a pulley ratchet 41 disposed on a front side or a circumferential surface of the energy release wheel 40 and connected with the driving pawl 63.

The check pawl 61 is mounted on the frame 10 through the pawl support shaft 62. When the driven wheel 20 is accumulating energy, the check pawl 61 has a claw portion slides on the back of the tooth of the circumferential ratchet teeth 23; when the driving wheel 101 and the driven wheel 20 are disengaged, the driven wheel 20 has a tendency to reversely rotate under the action of the stored energy. At this moment, the claw portion of the check pawl 61 is engaged with the slot of the circumferential ratchet teeth 23. Therefore, the driven wheel 20 is prevented from rotating in the reverse direction so as to prevent it from freely releasing the accumulated energy. When the energy is needed to be released, the claw portion of the check pawl 61 is controlled to disengage from the circumferential ratchet teeth through manual or intelligent electronic control. At this moment, the driven wheel 20 is reversely rotated under the traction of the flexible medium 31.

The driving pawl 63 is mounted on the rear side of the driven wheel 20 or on the circumferential wall adjacent to the rear side. When the driven wheel 20 is accumulating energy, the claw portion of the driving pawl 63 slides on the tooth back of the pulley ratchet 41. When the driven wheel 20 is reversely rotated to release energy, the claw portion of the driving pawl 63 is engaged in the tooth groove of the pulley ratchet 41 and drives the energy release wheel 40 to follow the rotating movement of the driven wheel 20.

2) The energy release control assembly 60 comprises a check pawl 61 that is in contact with the circumferential ratchet teeth 23 and a one-way bearing (not shown) connected between the driven wheel 20 and the energy release wheel 40. The one-way bearing can drive the energy release wheel 40 to rotate in the same direction as the driven wheel 20 when the driven wheel 20 is controlled to release the stored energy.

The check pawl 61 is mounted on the frame 10 through the pawl support shaft 62. When the driven wheel 20 is accumulating energy, the claw portion of the check pawl 61 slides on the back of the teeth of the circumferential ratchet teeth 23. When the driving wheel 101 and the driven wheel 20 are disengaged, the driven wheel 20 has a tendency to reversely rotate under the action of the stored energy. At this moment, the claw portion of the check pawl 61 is engaged with the slot of the circumferential ratchet teeth 23. Therefore, the driven wheel 20 is prevented from rotating in the reverse direction so as to prevent it from freely releasing the accumulated energy. When the energy is needed to be released, the claw portion of the check pawl 61 is controlled to disengage from the circumferential ratchet teeth through manual or intelligent electronic control. At this moment, the driven wheel 20 is reversely rotated under the traction of the flexible medium 31.

A bushing extending toward the energy release wheel 40 is disposed on the rear side of the driven wheel 20, the one-way bearing has an inner ring is sleeved on the bushing, and the energy release wheel 40 is sleeved on an outer ring of the one-way bearing. When the driven wheel 20 is accumulating energy, the inner ring of the one-way bearing is idling at one direction. When the driven wheel 20 is reversely rotated to release energy, the inner ring and the outer ring of the one-way bearing are engaged and follow the driven wheel 20 to reverse and drive the energy release wheel. 40 to rotate.

Figure 8:
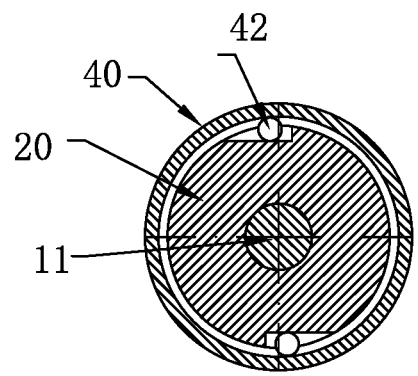
FIG. 8 is a schematic view showing that the energy release wheel 40 and the driving pawl 63 are constructed as friction ratchet mechanism.

3) The energy release control assembly 60 comprises a check pawl 61 that is in contact with the circumferential ratchet teeth 23 and a friction ratchet mechanism 42 connected between the driven wheel 20 and the energy release wheel 40. The friction ratchet mechanism 42 (as shown in FIG. 8) can drive the energy release wheel 40 to rotate in the same direction as the driven wheel 20 when the driven wheel 20 is controlled to release the stored energy.

8. The Single-Sided Multi-Set Energy Storage and Release Mechanism 104

As shown in FIG. 11, in order to increase the energy storage capacity and reduce the impact peak at the time of the first discharge, the energy storage and release mechanism 100 of the present invention can employ a plurality sets of the energy storage and release devices on one side of the driving wheel 101, that is, the single-side multi-set energy storage and discharge mechanism 104. For example, two sets of the energy storage and release device 102 are used.

The two sets of the energy storage and release device 102 are coaxially, sequentially and adjacently arranged. The set of the energy storage and release device 102 which is connected to the driving wheel 101 are referred to as a main energy storage and release device 1021, and the set of the energy storage and release device which is away from the driving wheel 101 is referred to as an auxiliary energy storage and release device 1022. In the auxiliary energy storage and release device 1022, the master-slave clutch control 50 is disposed between the energy release wheel 40 of the main energy storage and release device 1021 and the driven wheel 20 of the auxiliary energy storage and release device 1022, and the master-slave clutch control 50 can control the energy release wheel 40 in the main energy storage and release device 1021 and the driven wheel 20 in the auxiliary energy storage and release device 1022 to engage with or disengage from each other.

In the single-side multi-set energy storage and release mechanism, when the accumulator 30 stores relatively high levelly of energy and is controlled to release energy, the accumulator 30 not only drives the energy release wheel 40 of the main energy storage and release device 1021 to rotate to drive an external load 107, a part of the released energy can also be used to drive the auxiliary energy storage and release device 1022 to further store and release energy, therefore not only the impact peak of the load on the high discharge energy is reduced, but also the number of cycles energy release being driven can be increased.

9. The Two-Side Multi-Set Energy Storage and Release Mechanism 105

As shown in FIG. 12, in the same manner as the above-mentioned point 8, in order to increase the energy storage capacity and increase the number of cycles of energy release, the energy storage and release mechanism 100 of the present invention can employ a plurality sets of the energy storage and release devices on two sides of the driving wheel 101, that is, one set of the single-side multi-set energy storage and release mechanism 104 is disposed on each side of the driving wheel 101. For example, two sets of the energy storage and release device 102 are disposed on each side.

The construction is: the main support shaft 11 is extended in length to the other side of the driving wheel 101, and a set of the main energy storage and release device 1021 and the auxiliary energy storage and release device are sequentially disposed on the extended main support shaft 11 to form the single-side multi-set energy storage and release mechanism 104, and the master-slave clutch control 50 disposed on both sides of the driving wheel 101 is capable of linked motion at the left and right side, that is, if one end is engaged, the other end is disengaged, or is capable of autonomous control actions at the left and right sides.

The connection structure and working principle between the main energy storage and release device 1021 and the auxiliary energy storage and release device 1022 are identical to the point 8 as described above.

The two-side multi-set energy storage and release mechanism 105 can realize that when the single-side multi-set energy storage and release mechanism 104 on the right side of the driving wheel 101 completes energy storage and is in the discharge cycle, the single-side multi-set energy storage and release mechanism 104 on the left side of the driving wheel 101 is capable of being driven by the driving wheel 101 to simultaneously perform energy storage cycle. In this way, the operation at the left side and right side are alternately reciprocate, and therefore the waiting time for completing the energy storage cycle after each energy release can be effectively shortened for the external load 107 while maximizing the amount of energy to be save at one time.

What is claimed is:

1. A mechanism for storing and releasing mechanical energy which comprises a frame (10), a main support shaft (11) disposed on said frame (10), and a main driving wheel (101) coupled with said main support shaft (11) and rotating around said main support shaft (11), characterized in that: said mechanism for storing and releasing mechanical energy comprises at least one set of energy storage and release device (102) disposed on one side of said driving wheel (101), wherein said energy storage and release device (102) is constructed by a driven wheel (20), an accumulator (30), an energy release wheel (40), a master-slave clutch control (50) and an energy release control assembly (60), said master-slave clutch control (50) is disposed between said driving wheel (101) and said driven wheel (20) for controlling said main driving wheel (101) and said driven wheel (20) to engage with or disengage from each other; said accumulator (30) is connected with said driven wheel (20) for accumulating energy when said driven wheel (20) and said main driving wheel (101) are engaged and having rotational movement in the same direction; said energy release control assembly (60), after said driven wheel (20) and said main driving wheel (101) are disengaged, controls said accumulator (30) to release energy through said driven wheel (20) with a rotational movement in a reverse direction to accumulating energy, and drive said energy release wheel (40) to rotate in the reverse direction of said driven wheel (20); said accumulator (30) is mounted on said frame (10), said energy release control assembly (60) is mounted on said frame (10), said driven wheel (20) and said energy release wheel (40), wherein said master-slave clutch control (50), said driven wheel (20), said energy release wheel (40) and said main driving wheel (101) are coaxially arranged.

2. The mechanism for storing and releasing mechanical energy according to claim 1, characterized in that: said driving wheel (101) is connected to an externally connected driving force component (106) through a transmission mechanism, which includes a belt, a chain or a gear transmission mechanism; said energy release wheel (40) is connected with a transmission mechanism, which includes a belt, a chain or a gear transmission mechanism for connecting to an externally connected power output component.

3. The mechanism for storing and releasing mechanical energy according to claim 2, characterized in that: said accumulator (30) is connected to said driven wheel (20) by a rope, a belt or a chain and said accumulator (30) is a high-elastic coil spring, a high-elastic bow spring, a spiral spring or a cylinder-type air accumulator.

4. The mechanism for storing and releasing mechanical energy according to claim 3, characterized in that: said mechanism for storing and releasing mechanical energy comprises two energy storage and release devices coaxially, sequentially and adjacently arranged to define a main energy storage and release device (1021) and an auxiliary energy storage and release device (1022), wherein said master-slave clutch control (50) of said auxiliary energy storage and release device (1022) is disposed between said energy release wheel (40) of said main energy storage and release device (1021) and said driven wheel (20) of said auxiliary energy storage and release device (1022) and is capable of controlling said energy release wheel (40) and said driven wheel (20) to engage or disengage.

5. The mechanism for storing and releasing mechanical energy according to claim 4, characterized in that: said main support shaft (11) is extended in length toward another side of said driving wheel (101), and said main energy storage and release device (1021) and said auxiliary energy storage and release device (2022) are sequentially disposed on said extended main support shaft (11).

6. The mechanism for storing and releasing mechanical energy according to claim 2, characterized in that: said master-slave clutch control (50) is a mechanical meshing clutch assembly, an electromagnetic clutch assembly, a friction clutch assembly or a ratchet clutch assembly.

7. The mechanism for storing and releasing mechanical energy according to claim 6, characterized in that: said mechanism for storing and releasing mechanical energy comprises two energy storage and release devices coaxially, sequentially and adjacently arranged to define a main energy storage and release device (1021) and an auxiliary energy storage and release device (1022), wherein said master-slave clutch control (50) of said auxiliary energy storage and release device (1022) is disposed between said energy release wheel (40) of said main energy storage and release device (1021) and said driven wheel (20) of said auxiliary energy storage and release device (1022) and is capable of controlling said energy release wheel (40) and said driven wheel (20) to engage or disengage.

8. The mechanism for storing and releasing mechanical energy according to claim 7, characterized in that: said main support shaft (11) is extended in length toward another side of said driving wheel (101), and said main energy storage and release device (1021) and said auxiliary energy storage and release device (2022) are sequentially disposed on said extended main support shaft (11).

9. The mechanism for storing and releasing mechanical energy according to claim 2, characterized in that: said driven wheel 20 is constructed by a rotating wheel (22), a circumferential ratchet teeth (23) surrounding said rotating wheel (22) in a circumferential direction thereof and adjacent to a front side of said driven wheel (20), and a clutch driven member (51), wherein said clutch driven member (51) is disposed on an end surface of a cylinder (21) or a circumferential wall of the cylinder, and said cylinder is extended axially toward said main driving wheel (101); wherein said rotating wheel (22), said circumferential ratchet teeth (23) and said clutch driven member (51) are integral in structure; said master-slave clutch control 50 is formed by said clutch driven member (51), a clutch plate coupling member (52) sleeved on said main support shaft (11) and positioned on one side of the driving wheel (101), and a clutch plate movement control member (53).

10. The mechanism for storing and releasing mechanical energy according to claim 9, characterized in that: said energy release control assembly (60) comprises a check pawl (61) connected to said circumferential ratchet teeth (23), a driving pawl (63) disposed on a rear side of said driven wheel (20) and a pulley ratchet (41) disposed on a front side or a circumferential surface of said energy release wheel (40) and connected with said driving pawl (63).

11. The mechanism for storing and releasing mechanical energy according to claim 10, characterized in that: said mechanism for storing and releasing mechanical energy comprises two energy storage and release devices coaxially, sequentially and adjacently arranged to define a main energy storage and release device (1021) and an auxiliary energy storage and release device (1022), wherein said master-slave clutch control (50) of said auxiliary energy storage and release device (1022) is disposed between said energy release wheel (40) of said main energy storage and release device (1021) and said driven wheel (20) of said auxiliary energy storage and release device (1022) and is capable of controlling said energy release wheel (40) and said driven wheel (20) to engage or disengage.

12. The mechanism for storing and releasing mechanical energy according to claim 11, characterized in that: said main support shaft (11) is extended in length toward another side of said driving wheel (101), and said main energy storage and release device (1021) and said auxiliary energy storage and release device (2022) are sequentially disposed on said extended main support shaft (11).

13. The mechanism for storing and releasing mechanical energy according to claim 9, characterized in that: said energy release control assembly (60) comprises a check pawl (61) connected to said circumferential ratchet teeth (23) and a one-way bearing connected between said driven wheel (20) and said energy release wheel (40), said one-way bearing is arranged to drive said energy release wheel (40) to rotate in the same direction as said driven wheel (20) when said driven wheel (20) is controlled to release energy.

14. The mechanism for storing and releasing mechanical energy according to claim 13, characterized in that: said mechanism for storing and releasing mechanical energy comprises two energy storage and release devices coaxially, sequentially and adjacently arranged to define a main energy storage and release device (1021) and an auxiliary energy storage and release device (1022), wherein said master-slave clutch control (50) of said auxiliary energy storage and release device (1022) is disposed between said energy release wheel (40) of said main energy storage and release device (1021) and said driven wheel (20) of said auxiliary energy storage and release device (1022) and is capable of controlling said energy release wheel (40) and said driven wheel (20) to engage or disengage.

15. The mechanism for storing and releasing mechanical energy according to claim 14, characterized in that: said main support shaft (11) is extended in length toward another side of said driving wheel (101), and said main energy storage and release device (1021) and said auxiliary energy storage and release device (2022) are sequentially disposed on said extended main support shaft (11).

16. The mechanism for storing and releasing mechanical energy according to claim 9, characterized in that: said energy release control assembly (60) comprises a check pawl (61) connected to said circumferential ratchet teeth (23) and a friction ratchet mechanism (42) connected between said driven wheel (20) and said energy release wheel (40), wherein said friction ratchet mechanism (42) is capble of driving said energy release wheel (40) to rotate in the same direction as said driven wheel (20) when said driven wheel (20) is controlled to release energy.

17. The mechanism for storing and releasing mechanical energy according to claim 16, characterized in that: said mechanism for storing and releasing mechanical energy comprises two energy storage and release devices coaxially, sequentially and adjacently arranged to define a main energy storage and release device (1021) and an auxiliary energy storage and release device (1022), wherein said master-slave clutch control (50) of said auxiliary energy storage and release device (1022) is disposed between said energy release wheel (40) of said main energy storage and release device (1021) and said driven wheel (20) of said auxiliary energy storage and release device (1022) and is capable of controlling said energy release wheel (40) and said driven wheel (20) to engage or disengage.

18. The mechanism for storing and releasing mechanical energy according to claim 17, characterized in that: said main support shaft (11) is extended in length toward another side of said driving wheel (101), and said main energy storage and release device (1021) and said auxiliary energy storage and release device (2022) are sequentially disposed on said extended main support shaft (11).

19. The mechanism for storing and releasing mechanical energy according to claim 9, characterized in that: said mechanism for storing and releasing mechanical energy comprises two energy storage and release devices coaxially, sequentially and adjacently arranged to define a main energy storage and release device (1021) and an auxiliary energy storage and release device (1022), wherein said master-slave clutch control (50) of said auxiliary energy storage and release device (1022) is disposed between said energy release wheel (40) of said main energy storage and release device (1021) and said driven wheel (20) of said auxiliary energy storage and release device (1022) and is capable of controlling said energy release wheel (40) and said driven wheel (20) to engage or disengage.

20. The mechanism for storing and releasing mechanical energy according to claim 19, characterized in that: said main support shaft (11) is extended in length toward another side of said driving wheel (101), and said main energy storage and release device (1021) and said auxiliary energy storage and release device (2022) are sequentially disposed on said extended main support shaft (11).

21. The mechanism for storing and releasing mechanical energy according to claim 2, characterized in that: said mechanism for storing and releasing mechanical energy comprises two energy storage and release devices coaxially, sequentially and adjacently arranged to define a main energy storage and release device (1021) and an auxiliary energy storage and release device (1022), wherein said master-slave clutch control (50) of said auxiliary energy storage and release device (1022) is disposed between said energy release wheel (40) of said main energy storage and release device (1021) and said driven wheel (20) of said auxiliary energy storage and release device (1022) and is capable of controlling said energy release wheel (40) and said driven wheel (20) to engage or disengage.

22. The mechanism for storing and releasing mechanical energy according to claim 21, characterized in that: said main support shaft (11) is extended in length toward another side of said driving wheel (101), and said main energy storage and release device (1021) and said auxiliary energy storage and release device (2022) are sequentially disposed on said extended main support shaft (11).

* * * * *